May 20, 1947. J. H. WILLIAMS ET AL 2,420,951
OPTICAL APPARATUS FOR DETERMINING ANGLES
Filed Dec. 9, 1944
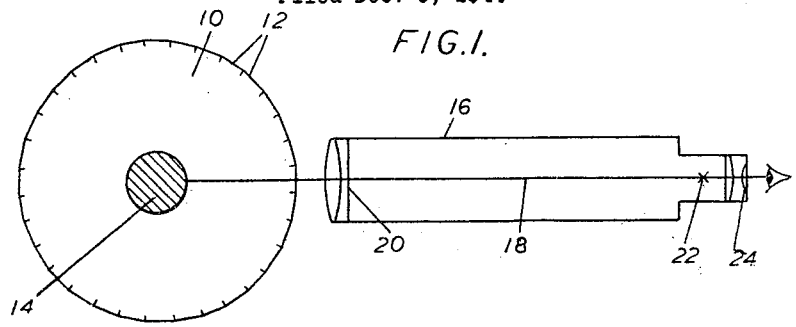
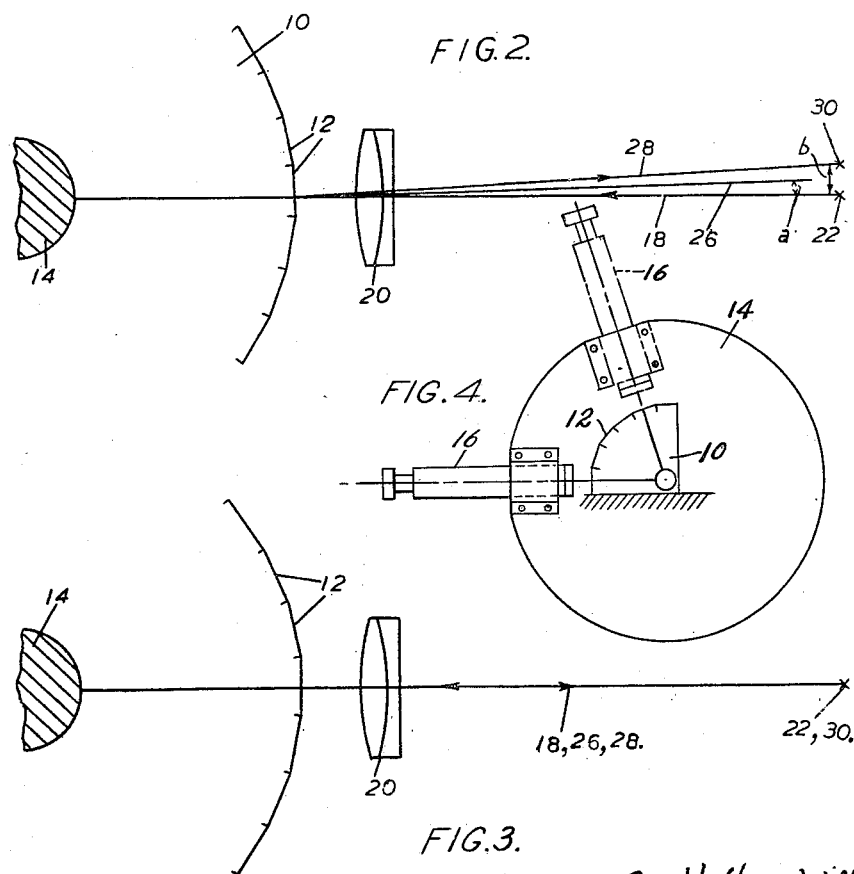
Joseph Henry Williams
Albert Edward Stenning
Reginald Herbert Stenning
INVENTORS
BY Stevens and Davis
their ATTORNEYS Patented May 20, 1947

2,420,951

UNITED STATES PATENT OFFICE 2,420,951

OPTICAL APPARATUS FOR DETERMINING ANGLES

Joseph Henry Williams, Carshalton, Albert Edward Stenning, Beckenham, and Reginald Herbert Stenning, Thorndene, England Application December 9, 1944, Serial No. 567,340
In Great Britain August 19, 1943

5 Claims. (Cl. 88—74)

This invention relates to apparatus for determining angles. The invention provides a substitute for divided circles and so-called division plates consisting of a disc having a number of concentric rings of spaced holes, which are used for example in cutting gear wheels, splined shafts and the like.

This optical division plate is set by means of a telescope having an index mark in its focal plane and directed towards the facets. This telescope is held rigidly in a fixed position and the division plate is rotated until one or other of its facets forms by reflection therein an image of a fixed object which coincides with the index mark, or is in alignment therewith or in some other predetermined relationship. There may be a graticule scale in the focal plane of the telescope in order that the divisions of the optical division plate may be sub-divided into smaller units.

The fixed object may be in the focal plane of a separate collimator, but it is preferred to employ the index mark itself, this index mark being illuminated and its image being brought into coincidence or alignment (or other definite relationship) with the index mark itself. Such an arrangement is known as an autocollimating telescope. The term "collimating telescope" will be used herein to include not only auto-collimating telescopes but also equivalent arrangements in which the object observed in the telescope is external thereto.

It will be appreciated that when the image is in coincidence or alignment with the index mark, the normal to the reflecting facet will be at a definite angle to the axis of the telescope (this angle being zero in the case of an autocollimating telescope) and that any deviation from this angle is doubled by the reflection from the facet. The invention, therefore, provides a means for setting a work-piece held between centres (or otherwise rotatably mounted) to which the optical division plate is attached, in a definite angular position to a very high degree of precision.

Referring to the accompanying drawings—

Figures 1, 2 and 3 are diagrams illustrating the mode of use of the improved division plate; and Figure 4 is a diagram illustrating an alternative mode of use of the improved division plate.

Referring to Figures 1, 2 and 3, a division plate according to this invention is indicated at 10, this division plate consisting of a polygonal prism having any desired number of sides or facets 12 which are plane or approximately plane reflecting surfaces. The prism need not be a regular figure; that is to say the facets 12 need not all be equal to one another in length circumferentially. The angle between normals to any two adjacent facets has an accurate predetermined value as required by the operation intended to be performed on a workpiece with the aid of the division plate. In general all these angles are equal but this is not necessarily the case; a division plate might be required for a special or particular purpose in which these angles differ in a predetermined manner.

Figure 1 represents a complete polygonal prism, but in some cases a quadrant or some other fraction or sector of a prism is all that is required.

The division plate is shown mounted on a mandrel 14 which carries a workpiece such as a sleeve in which a number of splines equally spaced circumferentially are to be cut and the number of facets 12 on the division plate is made equal to the number of splines to be cut. The numeral 14 may be taken to represent, not a mandrel, but a part of the workpiece itself in some cases. It may here be stated that the division plate, whether it is a complete polygon or a sector only, need not be mounted precisely concentrically on the mandrel or workpiece 14 because any eccentricity merely displaces all the facets 12 parallel to themselves without altering the angles between them and it is these angles that determine the angular setting or adjustment of the workpiece as will now be described.

At one side of the division plate is mounted a refracting telescope 16. The optical axis 18 of this telescope is directed towards the axis of rotation of the mandrel or workpiece 14, but it need not intersect that axis precisely. In the focal plane of the object glass 20 of this telescope is an illuminated index mark 22 and this index mark, together with its image formed by reflection in a facet 12, is viewed through an eyepiece 24. The telescope 16 is mounted rigidly so that its optical axis maintains its direction precisely. The index mark 22 need not be precisely on the optical axis; if it is displaced slightly from that axis there will nevertheless be a definite line of collimation extending from the index mark through the object-glass, and the line 18 may be taken to represent this line of collimation.

Referring now to Figure 2, the division plate 10 is shown in such an angular position that a normal 26 to one of the facets 12 makes a small angle $a$ with the line of collimation 18 of the telescope. The axial ray of the beam of light from the index mark 22 is coincident with the line of collimation 18. After reflection at the facet 12 this ray returns through the object-glass 20 along a path 28 inclined to the line of collimation 18 at an angle $b$ which is twice the angle $a$, and the returning light forms an image 30 of the index mark 22. When the angle $a$ is small this image 30 is within the field of the eyepiece 24 and will be seen at the same focus as the index mark itself. When the division plate is turned to the position shown in Figure 3 in which the normal 26 is coincident with the line of collimation 18, the ray 28 also coincides with this line and the image 30 is superimposed on and in register with the index mark 22. Owing to the fact that the angle $b$ is twice the angle $a$, and also owing to the fact that the index mark and its image are seen highly magnified by the eyepiece 24, the arrangement illustrated enables the angular position of the division plate 10, and therefore the workpiece, to be determined or set with extreme precision, far surpassing that obtainable with division plates or divided circles of the kinds hitherto used.

In some cases the arrangement described with reference to Figures 1, 2 and 3 may be varied in the manner illustrated diagrammatically in Figure 4, in which a quadrant 10 having six facets 12 is shown supported rigidly in a fixed position in proximity to a workpiece 14 held in a chuck or on a faceplate (not shown) of a machine tool, an autocollimating telescope 16 being rigidly secured to the workpiece 14 and directed towards the facets 12. A complete polygonal division plate could, of course, be used when required instead of the quadrant shown.

It will be appreciated that this arrangement is an inversion of that shown in Figures 1, 2 and 3, and that the results obtained are the same. The choice between the two arrangements is a matter of practical convenience.

Division plates according to this invention are preferably made of glass, and it is preferred to employ a low-expansion variety of glass; but other materials may be employed if desired, for example speculum metal or rustless steel.

What we claim is:
1. Apparatus for determining angular positions of a workpiece rotatably mounted in a machine tool, comprising an optical division plate having a number of optically-worked plane or approximately plane reflecting facets on its edge and secured to the workpiece, and a collimating telescope rigidly mounted and directed towards the edge of the optical division plate, said telescope being located approximately in the same plane as said division plate with its optical axis normal to each facet of the division plate when said facet lies adjacent said telescope.

2. Apparatus for determining angular positions of a workpiece rotatably mounted in a machine tool, comprising an optical division plate having a number of optically-worked plane or approximately plane reflecting facets on its edge and mounted rigidly in a fixed position, and a collimating telescope mounted on the workpiece and directed towards the edge of the optical division plate, said telescope being located approximately in the same plane as said division plate with its optical axis normal to each facet of the division plate when said facet lies adjacent said telescope.

3. Apparatus for determining angular positions of a workpiece in a machine tool, comprising a combination of two relatively rotatable members, namely a rotatably mounted workpiece and a fixed support, an optical division plate having a number of optically worked reflecting facets on its edge, and a collimating telescope directed towards the edge of the optical division plate, said telescope being located approximately in the same plane as said division plate with its optical axis normal to each facet of the division plate when said facet lies adjacent said telescope, said optical division plate being rigidly secured to one of said relatively rotatable members and said collimating telescope being rigidly mounted on the other of said members.

4. Apparatus according to claim 3, wherein the telescope is an autocollimating telescope.

5. Apparatus according to claim 3, wherein the optical division plate is a complete polygonal prism.

JOSEPH HENRY WILLIAMS.
ALBERT EDWARD STENNING.
REGINALD HERBERT STENNING.

REFERENCES CITED

The following references are of record in the file of this patent:

UNITED STATES PATENTS

| Number | Name | Date |
| --- | --- | --- |
| 2,368,434 | Turrettini | Jan. 30, 1945 |
| 1,214,863 | Woeste | Feb. 6, 1917 |
| 2,356,184 | Simons | Aug. 22, 1944 |
| 2,301,935 | Ehringhaus | Nov. 17, 1942 |

OTHER REFERENCES

Hardy and Perrin (Text), "Principles of Optics," published by McGraw-Hill, New York (1932), p. 376 and 377 cited.